(12) United States Patent
Loos et al.

(10) Patent No.: US 8,925,843 B2
(45) Date of Patent: Jan. 6, 2015

(54) KITCHEN SHREDDER

(71) Applicant: Ingenious Marketing LLC, Denver, CO (US)

(72) Inventors: Gail D. Loos, Centennial, CO (US); James E. Jones, Denver, CO (US); James P. Monahan, Denver, CO (US); Jeffrey L. Schaefer, Lakewood, CO (US); Shane Korthuis, Denver, CO (US)

(73) Assignee: Ingenious Marketing LLC, Denver, CO (US)

( * ) Notice: Subject to any disclaimer, the term of this patent is extended or adjusted under 35 U.S.C. 154(b) by 0 days.

(21) Appl. No.: 14/347,480

(22) PCT Filed: Sep. 30, 2012

(86) PCT No.: PCT/US2012/058199
§ 371 (c)(1),
(2) Date: Mar. 26, 2014

(87) PCT Pub. No.: WO2013/049777
PCT Pub. Date: Apr. 4, 2013

(65) Prior Publication Data
US 2014/0231563 A1    Aug. 21, 2014

Related U.S. Application Data

(63) Continuation of application No. 13/200,808, filed on Sep. 30, 2011, now Pat. No. 8,727,251.

(51) Int. Cl.
*B02C 18/16* (2006.01)
(Continued)

(52) U.S. Cl.
CPC ............. *A47J 43/07* (2013.01); *B02C 18/0084* (2013.01); *B02C 18/14* (2013.01);
(Continued)

(58) Field of Classification Search
USPC ....................................... 241/243, 100, 285.2
See application file for complete search history.

(56) References Cited

U.S. PATENT DOCUMENTS

| 5,913,484 A | 6/1999 | Kurtz |
| 5,992,777 A * | 11/1999 | Aagaard ....................... 241/236 |

(Continued)

FOREIGN PATENT DOCUMENTS

| JP | 2001-149807 | 6/2001 |
| JP | 2003-154287 | 5/2003 |

(Continued)

OTHER PUBLICATIONS

International Search Report & Written Opinion for PCT/US2012/058199, KIPO, dated Mar. 8, 2013 (8 pages).

(Continued)

*Primary Examiner* — Mark Rosenbaum
(74) *Attorney, Agent, or Firm* — Terrence M. Wyles, Esq.; Startup IP Law, LLC

(57) ABSTRACT

An apparatus for pre-composting organic material, comprising: a housing with two openings and a pre-composting means between the two openings wherein kitchen scraps may be fed in the first opening and the pre-composted scraps exit the second opening. In an embodiment of the present invention the pre-composter includes: a lid assembly which may facilitate feeding scraps into the pre-composter; a hopper and blade assembly for pre-composting or cutting and shredding the scraps; a component tray for securing the housing to the hopper; a bin for collecting the pre-composted scraps; and a crank assembly which delivers rotational power to the blade assembly.

27 Claims, 26 Drawing Sheets

(51) Int. Cl.
*A47J 43/07* (2006.01)
*B02C 18/00* (2006.01)
*B02C 18/14* (2006.01)
*B02C 18/18* (2006.01)
*B02C 18/24* (2006.01)

(52) U.S. Cl.
CPC ................ *B02C 18/18* (2013.01); *B02C 18/24* (2013.01); *B02C 18/16* (2013.01); *B02C 2018/162* (2013.01); *B02C 2018/188* (2013.01)
USPC .......................... 241/100; 241/243; 241/285.2

(56) References Cited

U.S. PATENT DOCUMENTS 7,607,600 B2    10/2009   Salgado et al.
8,727,251 B2 *  5/2014    Loos et al. .................... 241/100
2003/0230657 A1   12/2003   Dorscht

FOREIGN PATENT DOCUMENTS

| JP | 2004275840 A | 10/2004 |
| JP | 2008074512 A | 4/2008 |
| JP | 2088-238010 | 10/2008 |
| JP | 2011-131169 | 7/2011 |

OTHER PUBLICATIONS

European Patent Office (EPO) Search Report for EPO Patent Application No. EP 12 83 7401 (EPO Regional-Stage Entry from PCT Application No. PCT/US2012/058199), dated Oct. 22, 2014 (3 pages).

* cited by examiner

KITCHEN SHREDDER

BENEFIT CLAIMS TO RELATED APPLICATIONS

This application claims priority of U.S. non-provisional application Ser. No. 13/200,808 filed Sep. 30, 2011 in the names of Gail D. Loos, James E. Jones, James P. Monahan, Jeffery L. Schaefer, and Shane Korthuis, said non-provisional application being hereby incorporated by reference as if fully set forth herein.

FIELD OF THE INVENTION

The field of the present invention generally relates to devices which reduce the size of food items. The field of the present invention specifically relates to new field—pre-composting organic material. In particular, a pre-composter including two openings and pre-composting means therebetween wherein organic materials from the kitchen are shredded and/or cut into smaller pieces which are then composted. Shredding kitchen scraps may be for the additional purpose of simply lower the volume of household garbage. More particularly the invention relates to a hand-operated pre-composter for kitchen use.

BACKGROUND

It is important to note that "pre-composting" has different definitions in the public domain. For the purposes of the present invention pre-composting means shredding, cutting, mashing and/or other similar means of lowering the volume and/or increasing the surface area, of organic kitchen scraps. A smaller volume of garbage is typically easier to transport. An increased surface area of organic matter typically decomposes in a notable shorter period of time. Such decomposition may be utilized for the generation of methane and/or may be for composting purposes wherein the byproduct is a soil amendment.

The background of the invention is in one respect extensive and in another limited. Composting organic material has been done for centuries wherein a soil amendment is derived from the composting process. The soil amendment may vary depending upon the time and extent of decomposition the organic material has undergone.

Recently backyard or even in-house composting containers have been made and sold to facilitate home composting. These are designed to receive organic materials and over time decomposition thereof, and with some containers means by which the materials may be rotated by the container, render a soil amendment.

The rate of decomposition of the organic material will vary depending upon a number of factors well known in the art. Regardless, the rate of decomposition will be lowered, and under many circumstances lowered significantly, if the surface area of the organic material is increased.

General awareness of human impact of the environment has become acute. Composting organic material by individual households has a number of environmental benefits well-known in the art. As of late, an environmental desire to merely lower the volume and/or weight of the garbage has been identified as such a benefit.

The containers and products on the market related to composting do not include a product designed specifically to lower the volume and/or weight of organic material handled by garbage pick-up services and/or increasing the surface are of organic materials to expedite the decomposition process. In this respect, the subject invention relates to a new product concept which does not have a background which includes similar products with such product goals.

SUMMARY

An apparatus for pre-composting organic material, comprising: a housing with two openings and a pre-composting means between the two openings wherein kitchen scraps may be fed in the first opening and the pre-composted scraps exit the second opening. In an embodiment of the present invention the pre-composter includes: a lid assembly which may facilitate feeding scraps into the pre-composter; a hopper and blade assembly for pre-composting or cutting and shredding the scraps; a component tray for securing the housing to the hopper; a bin for collecting the pre-composted scraps; and a crank assembly which delivers power to the blade assembly.

The pre-composter is also designed to temporarily store pre-composted material and dispense the material to a storage container with a volume larger than the bin's.

The precomposter may be a counter-top apparatus which may improve public compliance with composting or waste diversion requirements by providing a sanitary storage and transport method while reducing the volume of typical food waste.

Objects and advantages pertaining to the present inventions disclosed herein may become apparent upon referring to the exemplary embodiments illustrated in the drawings herein and disclosed in the following detailed description and/or claims.

Figure 1A:
FIGS. 1A-1G are perspective, top, bottom, left, front, right, and back views, respectively, of an exemplary kitchen shredder.
Figure 1B:
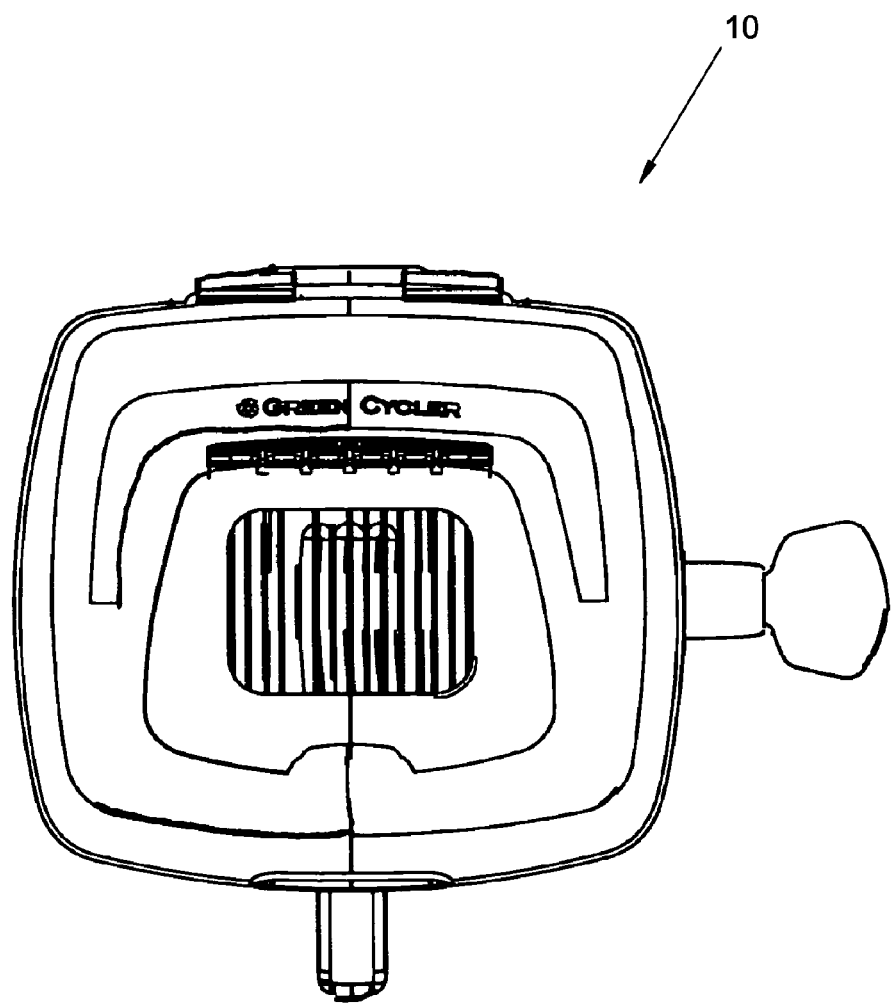
Figure 1C:
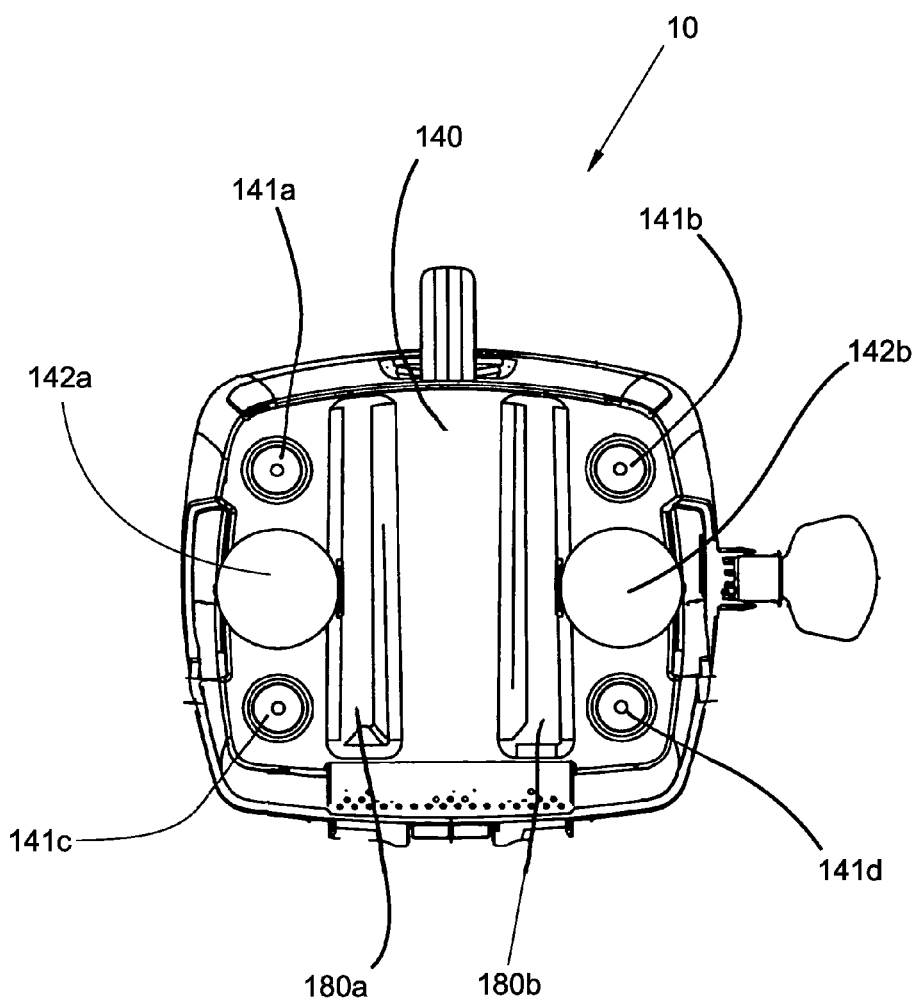
Figure 1D:
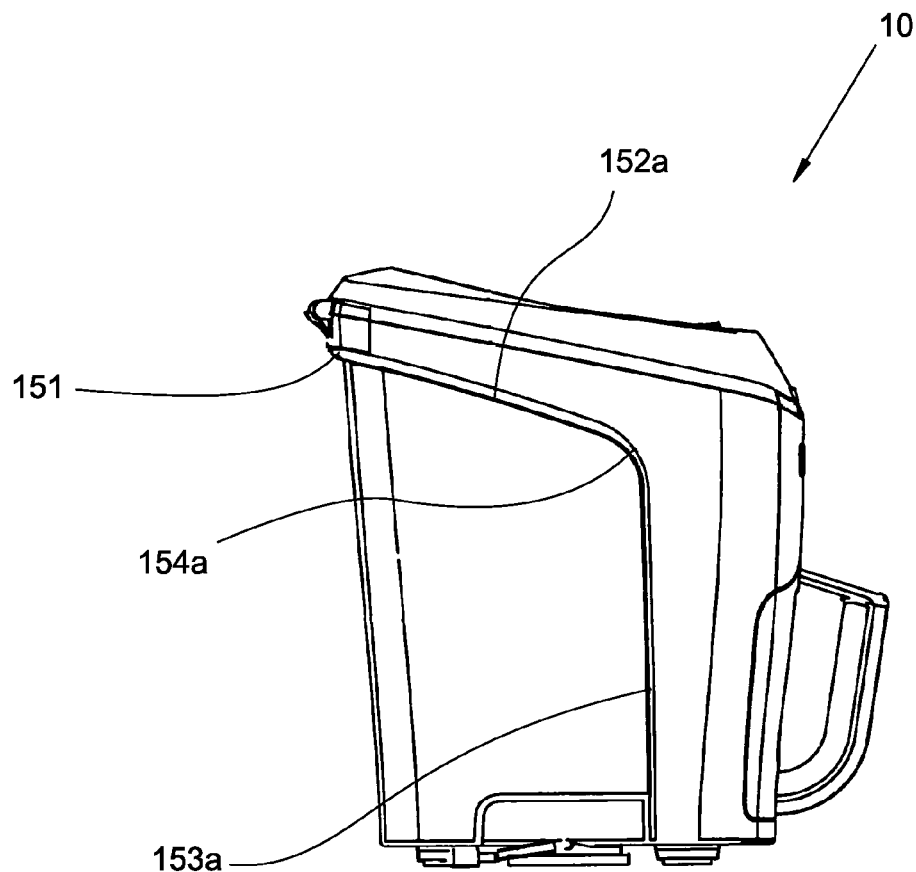
Figure 1E:
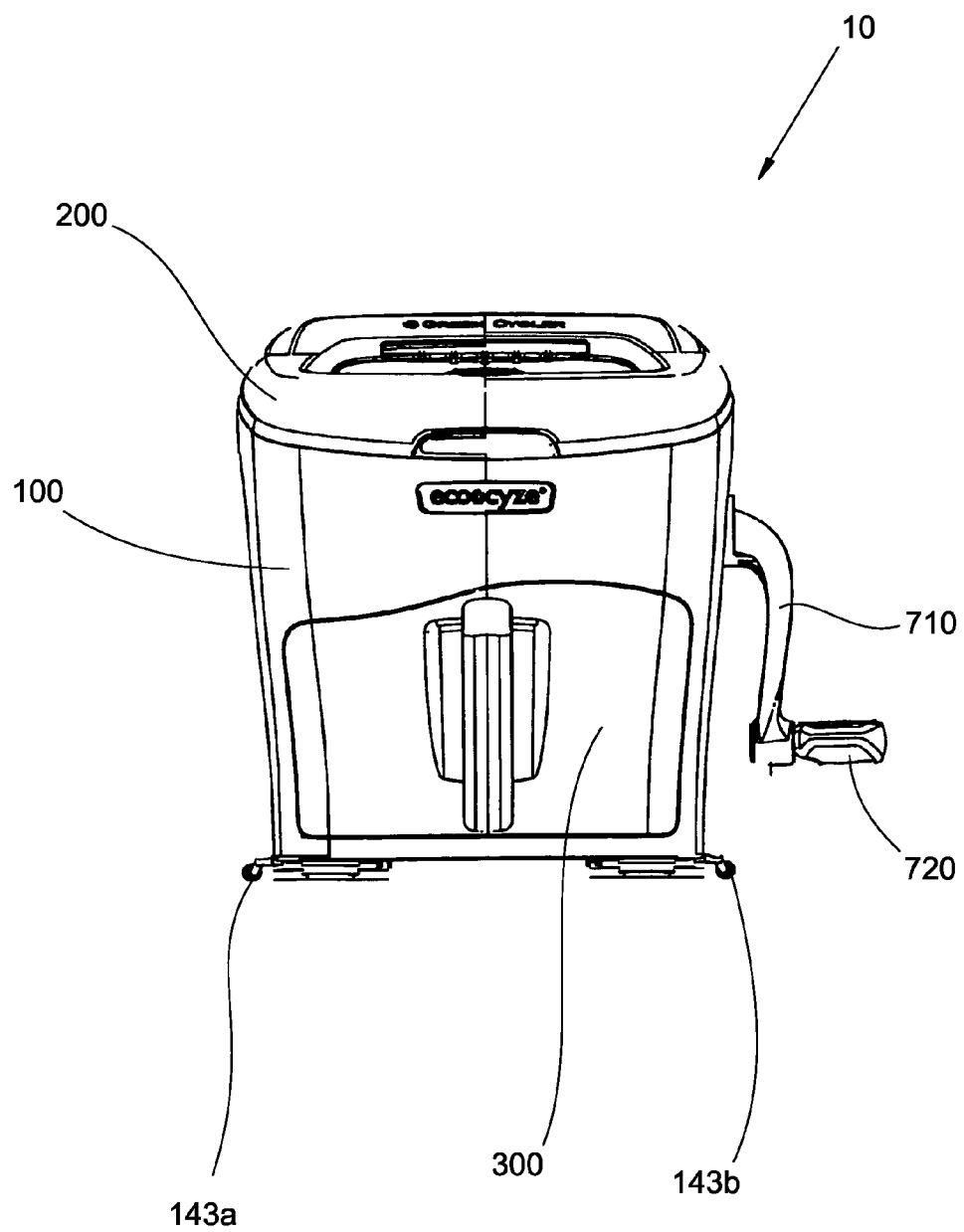
Figure 1F:
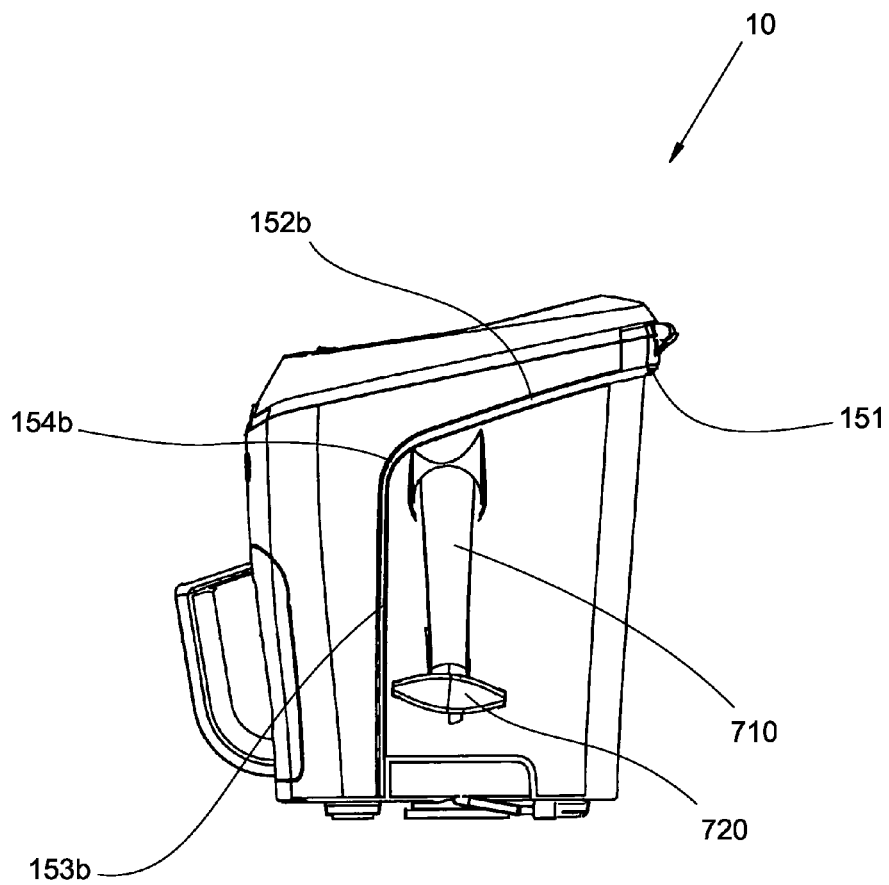
Figure 1G:
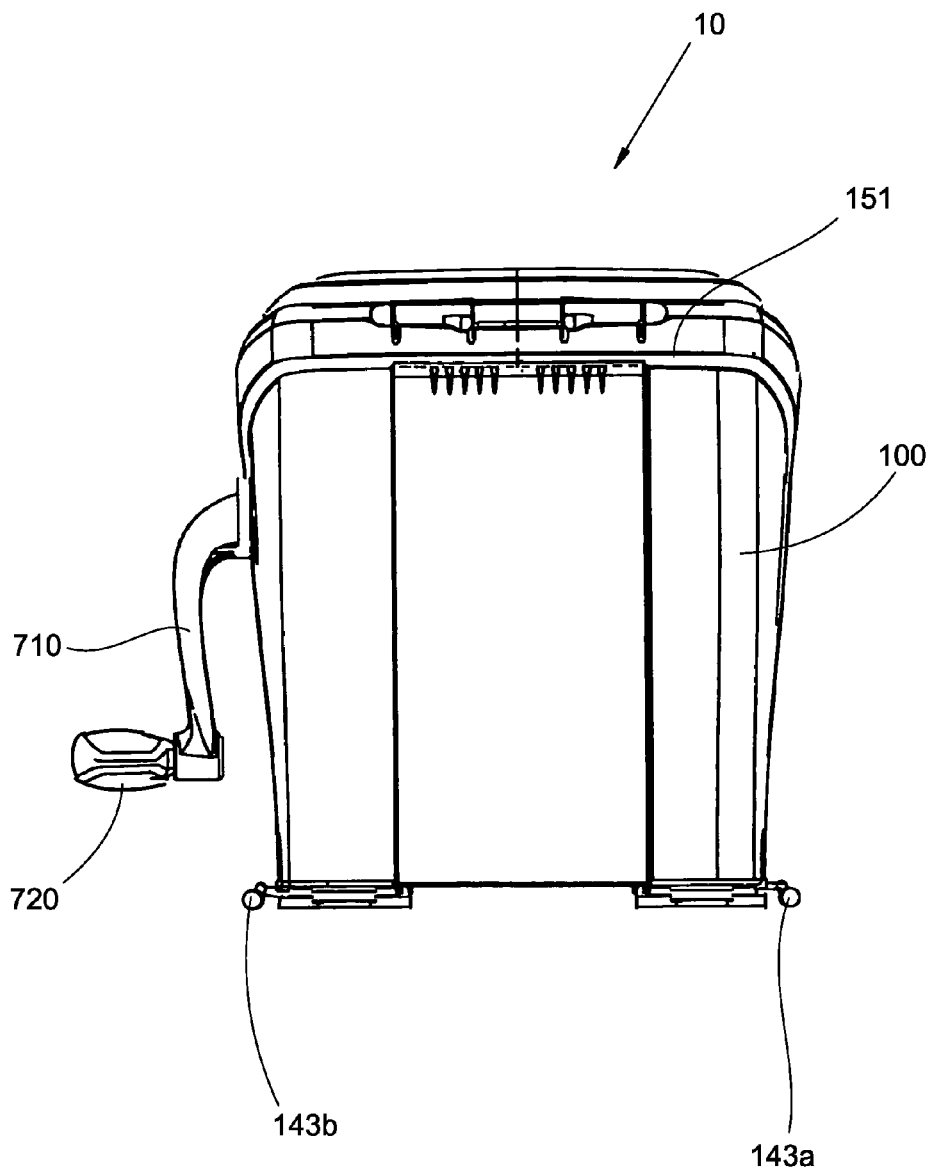
Figure 1H:
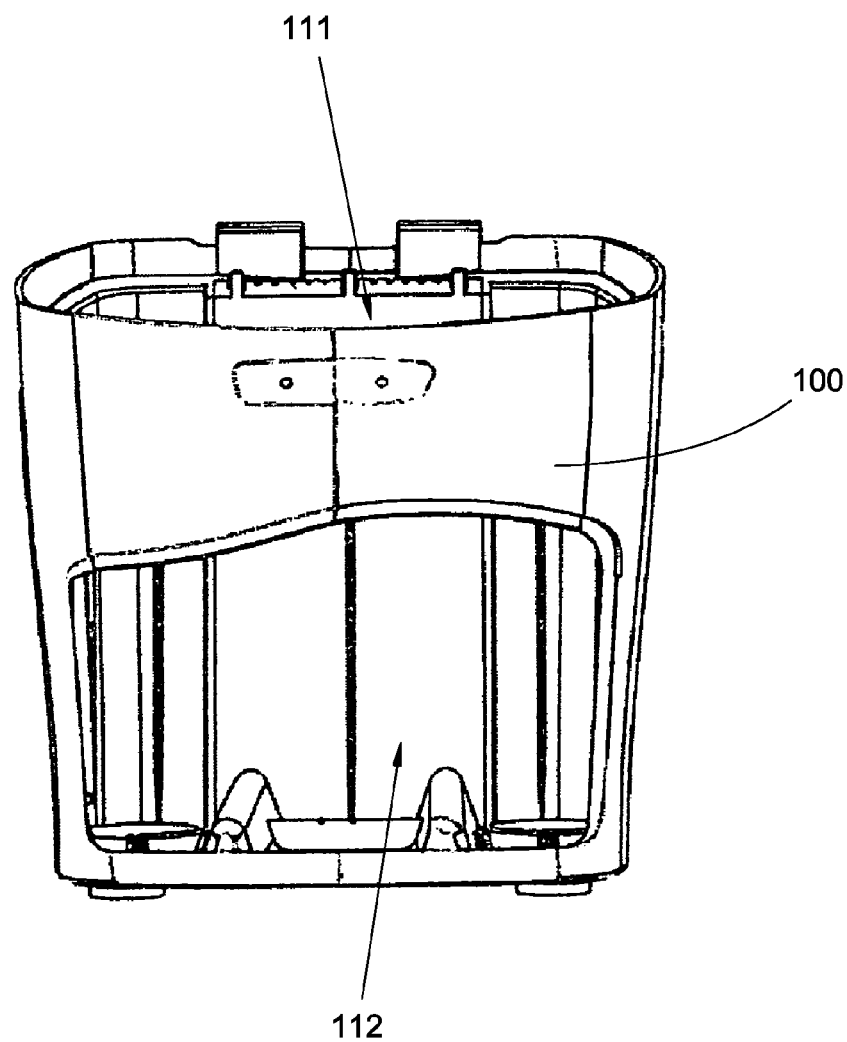
FIG. 1H is a front view of a housing of the exemplary kitchen shredder.
Figure 2A:
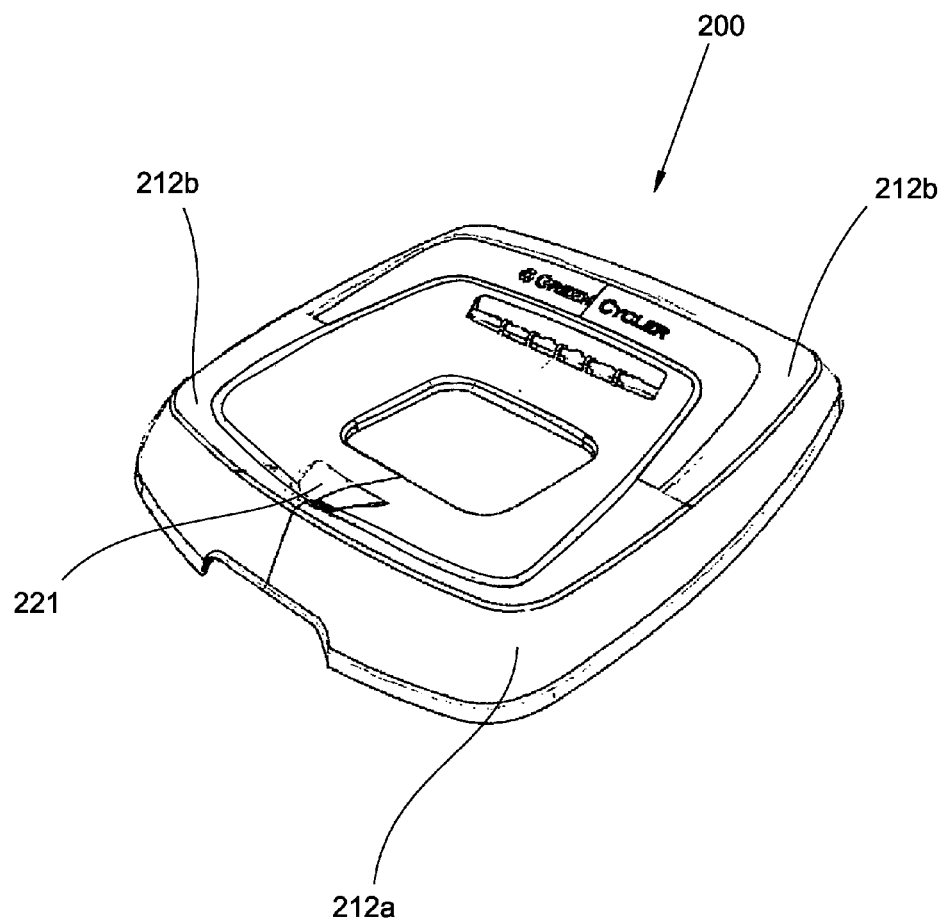
FIGS. 2A and 2B are perspective views of a main lid and a hatch lid, respectively, of the exemplary kitchen shredder.
Figure 2B:
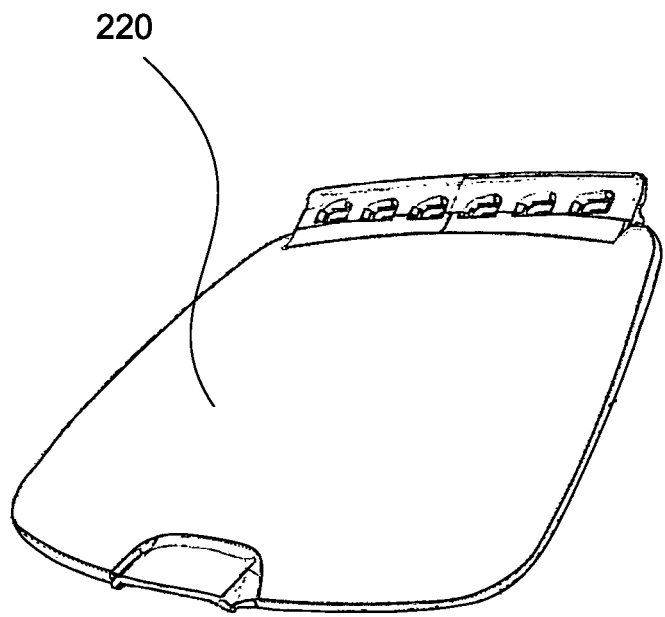
Figure 2C:
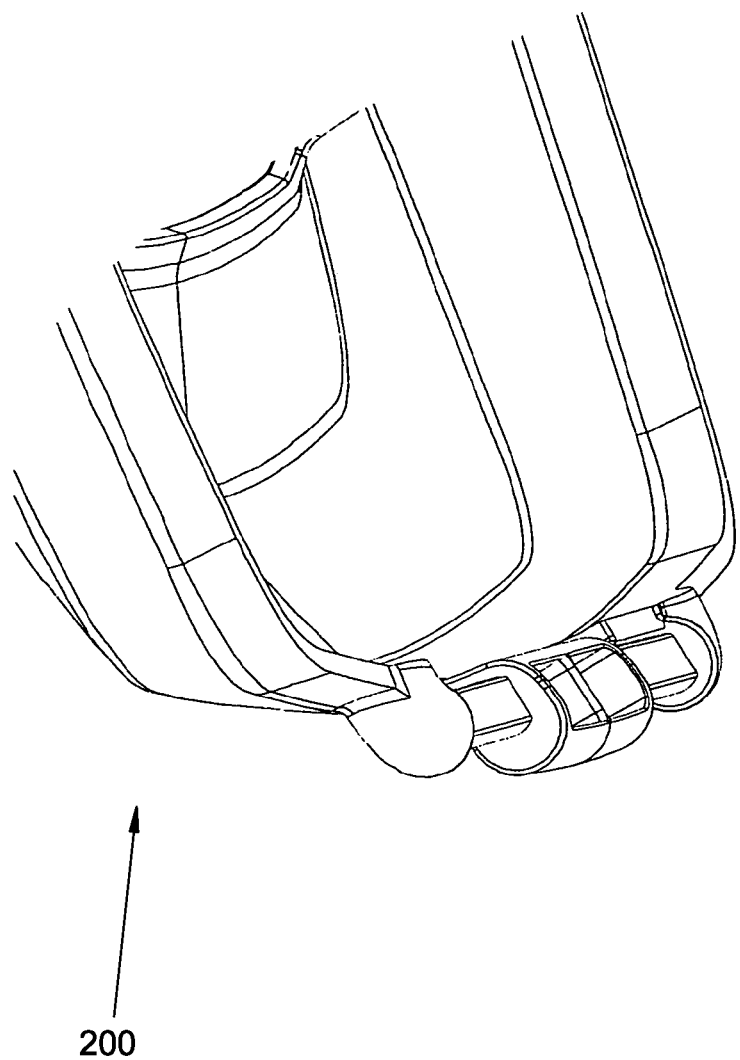
FIGS. 2C-2E are detailed views of a main lid hinge of the exemplary kitchen shredder.
Figure 2D:
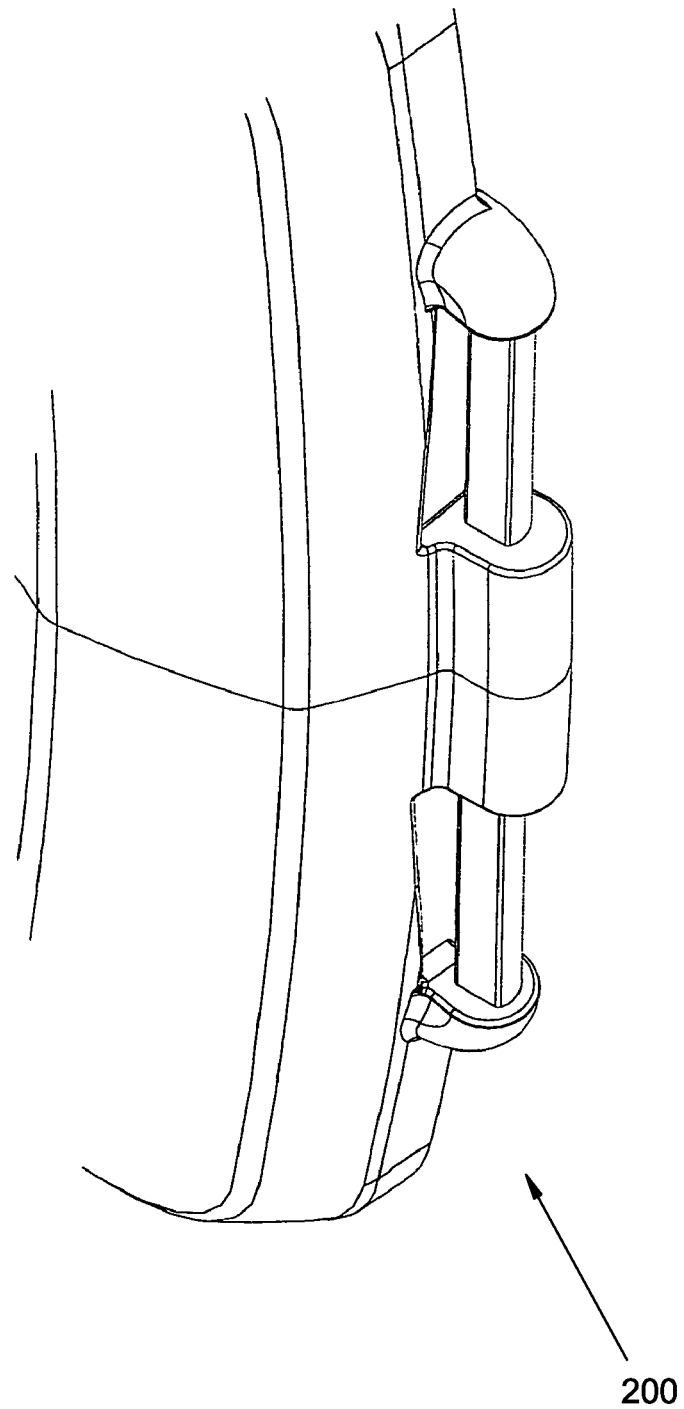
Figure 2E:
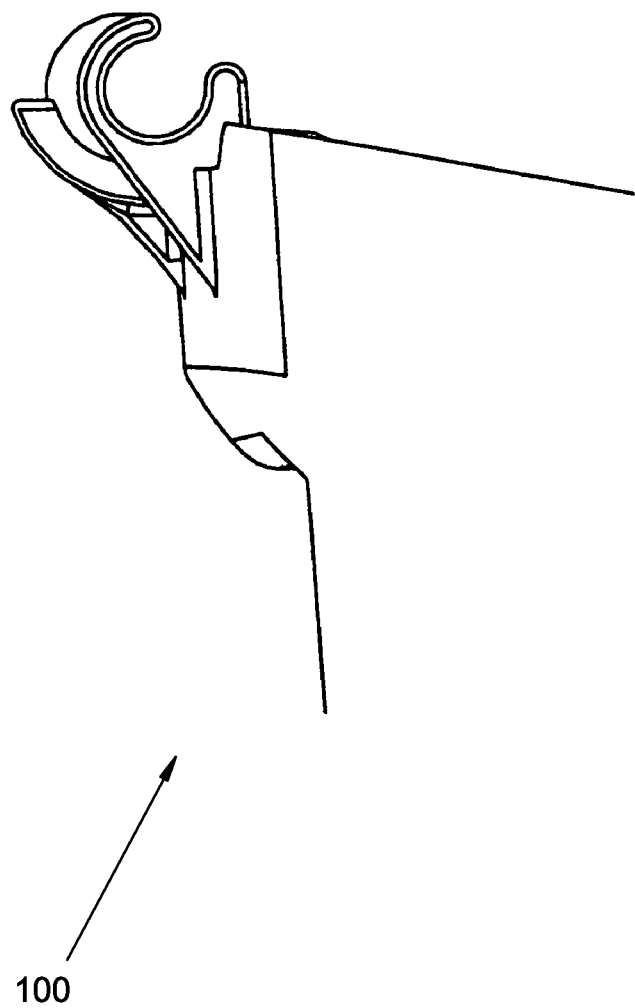
Figure 2F:
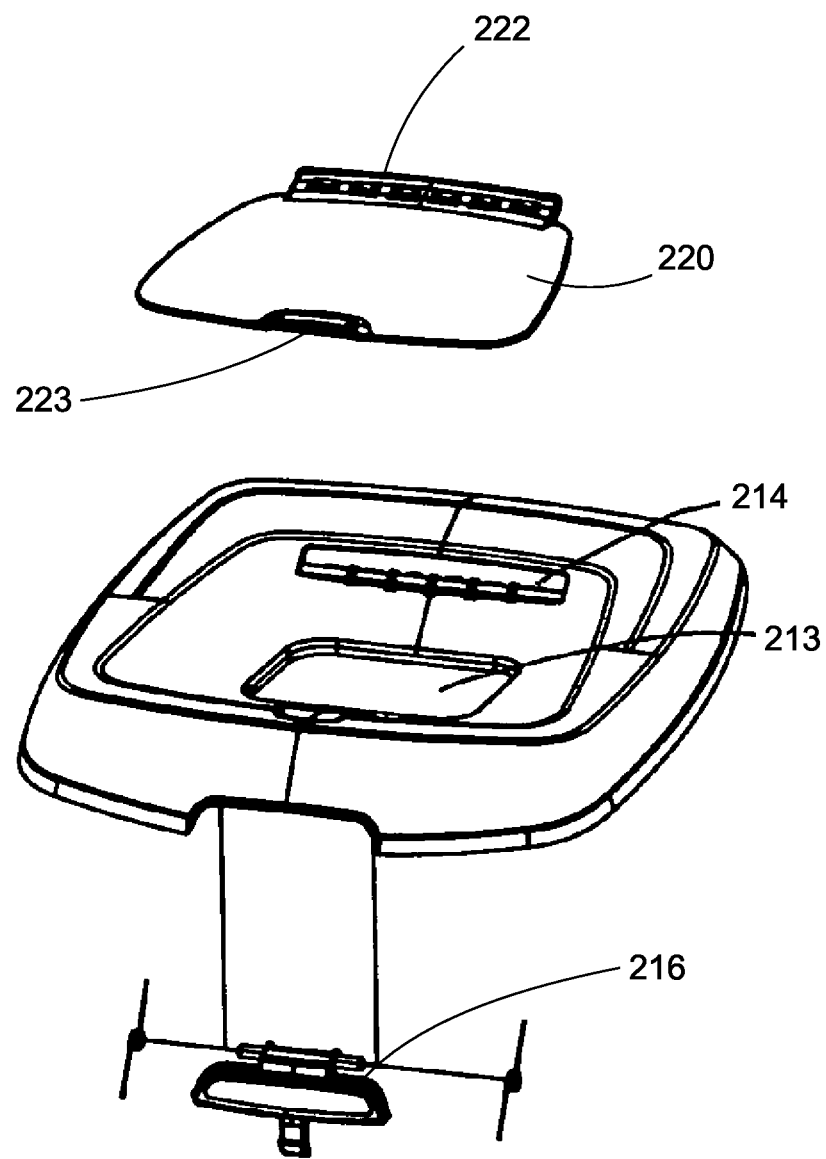
FIG. 2F is an exploded view of the main lid, the hatch lid, and a spring-loaded main lid hatch latch.
Figure 2G:
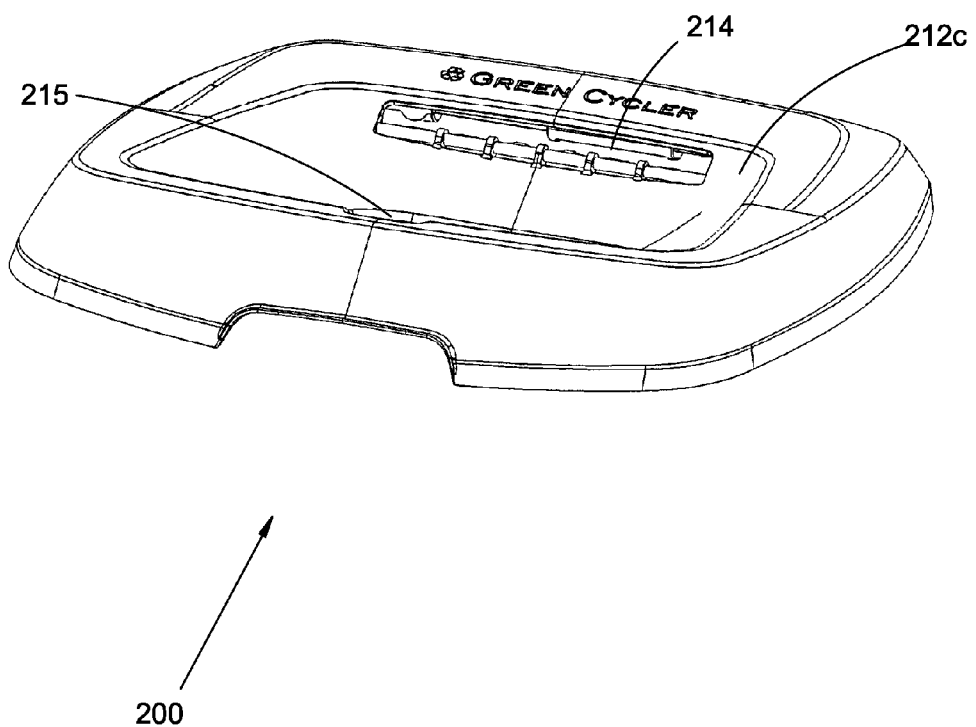
FIG. 2G is another perspective view of the main lid.
Figure 3A:
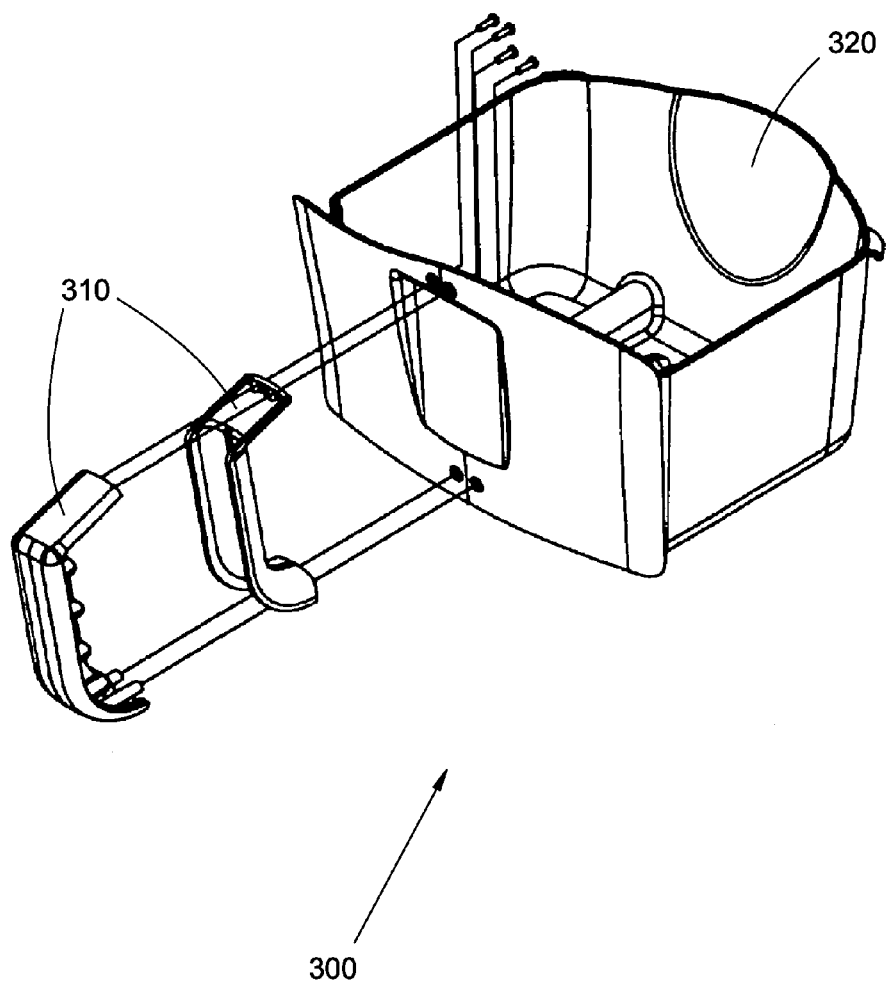
FIG. 3A is an exploded view of a bin and bin handle assembly of the exemplary kitchen shredder.
Figure 3B:
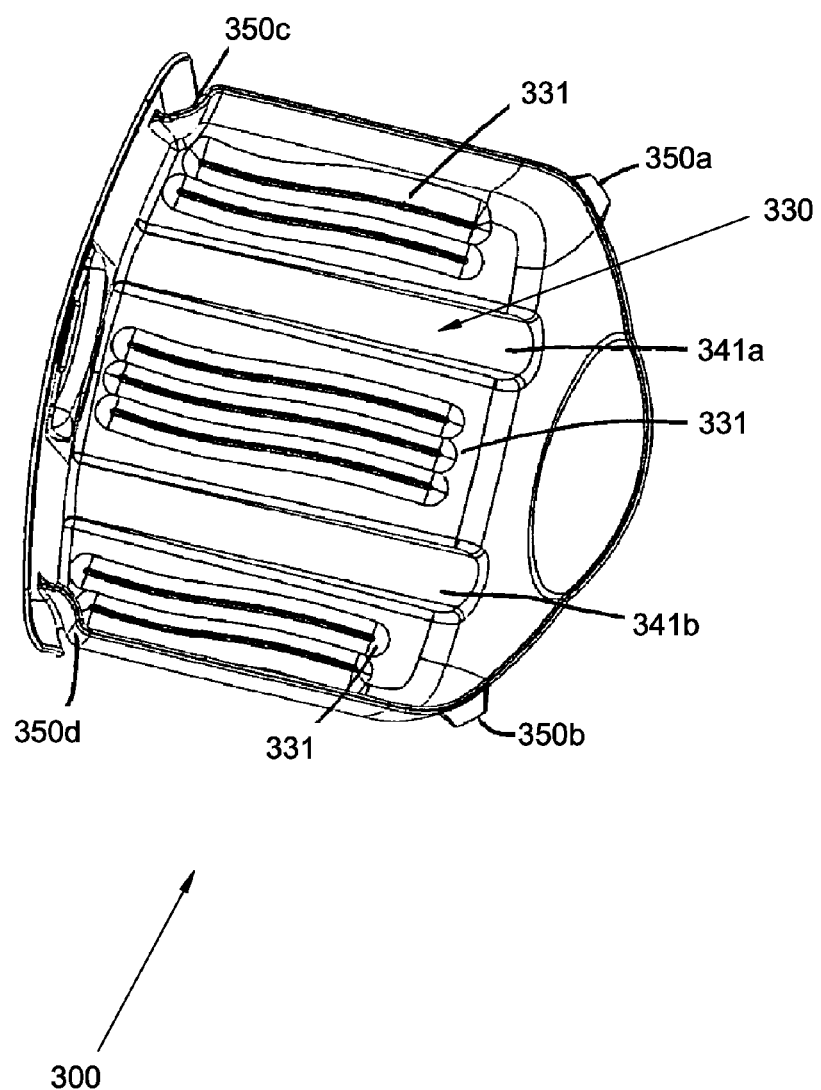
FIGS. 3B and 3C are top and bottom views, respectively, of the bin.
Figure 3C:
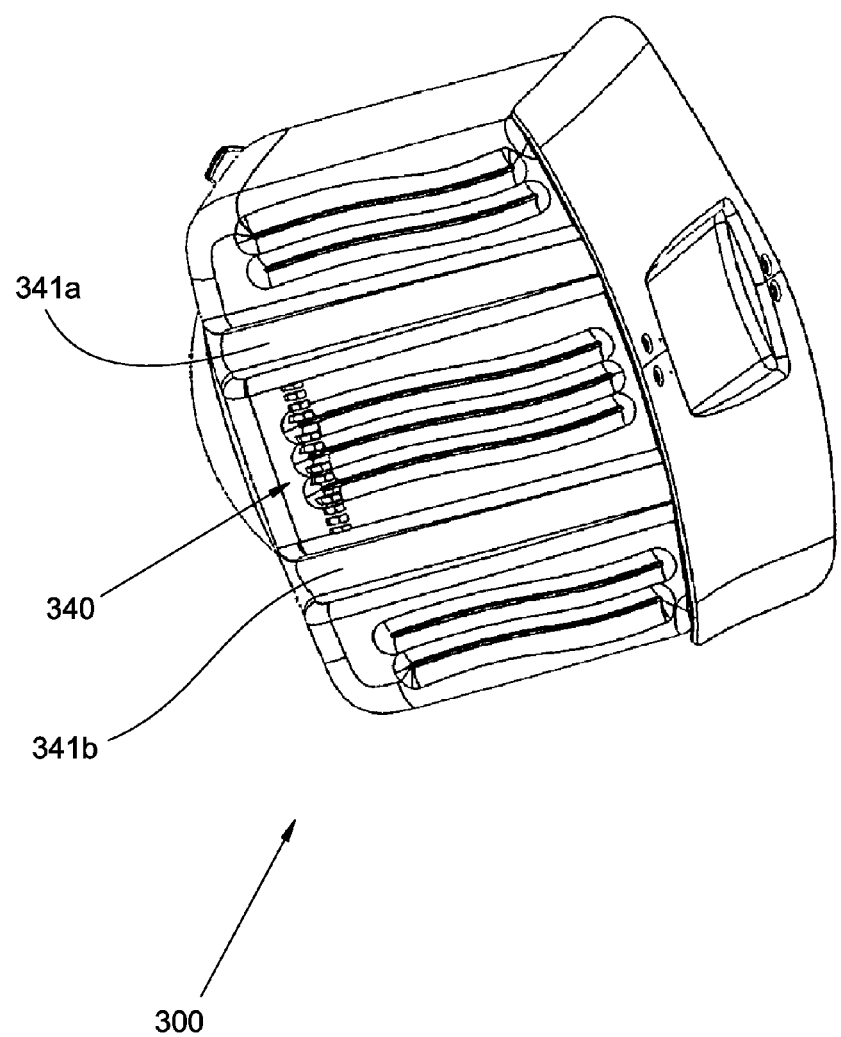
Figure 4:
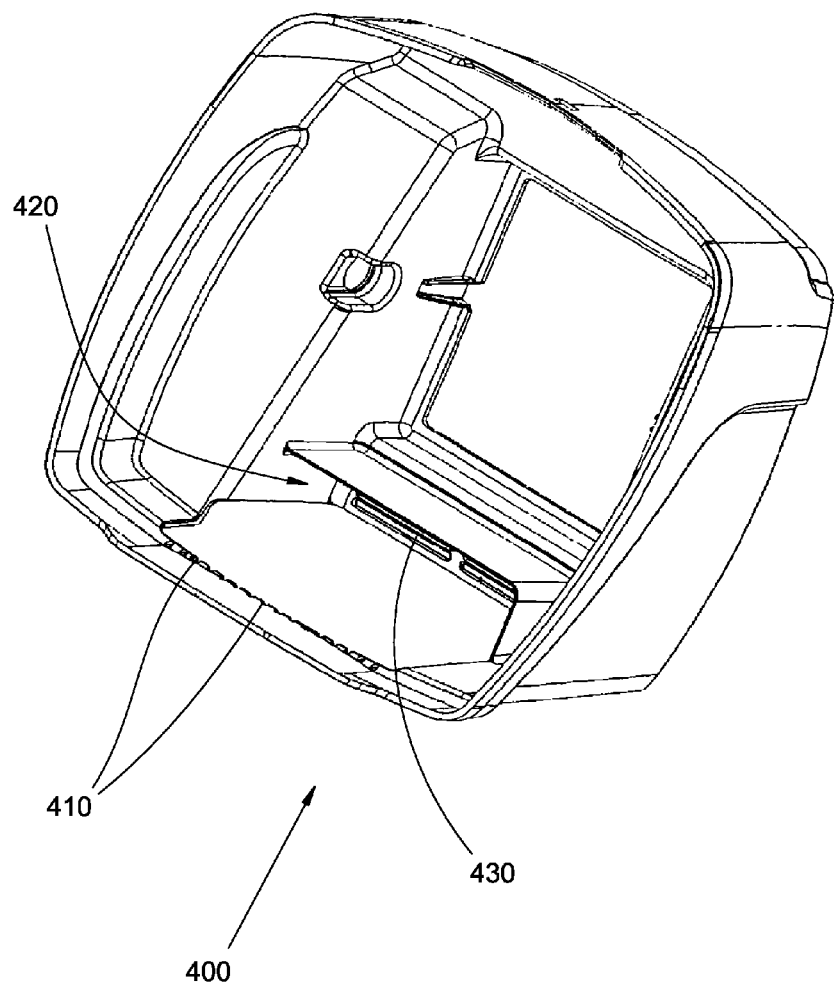
FIG. 4 is a perspective view of a component tray of the exemplary kitchen shredder.
Figure 5A:
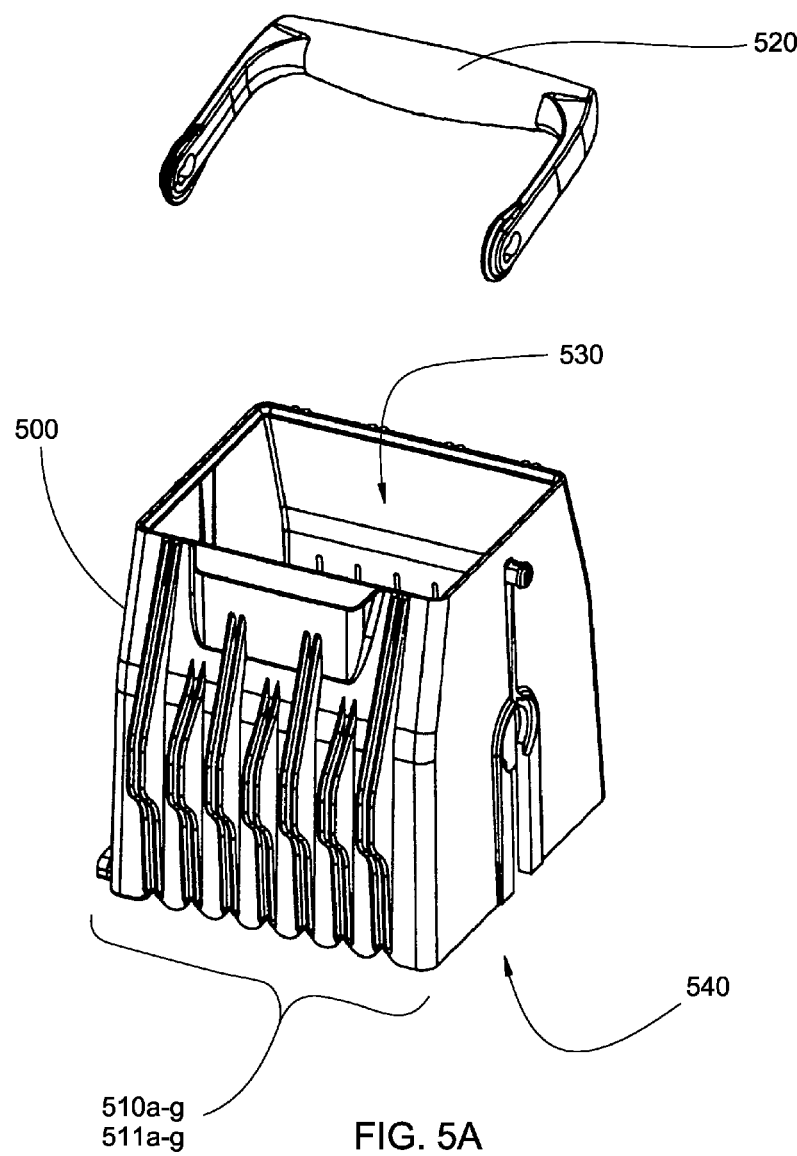
FIG. 5A is an exploded view of a hopper and hopper handle of the exemplary kitchen shredder.
Figure 5B:
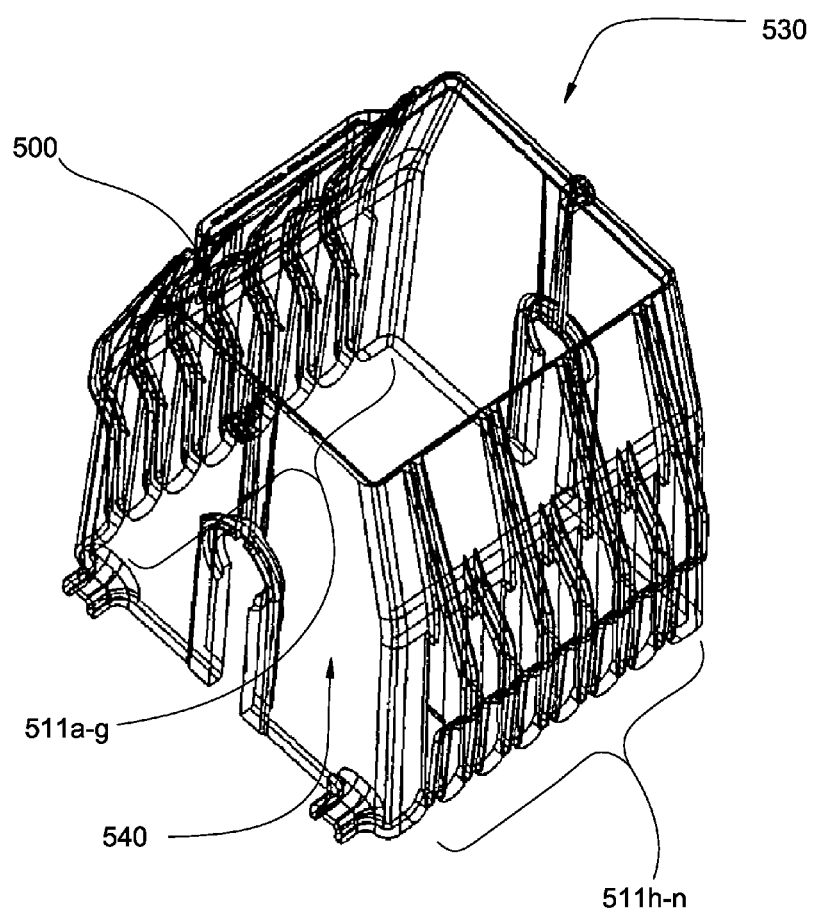
FIG. 5B is a transparent perspective view of the hopper from below.

| PARTS LIST | | |
|---|---|---|
| 10 | Pre-composter | |
| 100 | Housing | |
| | 111 | First Opening |

PARTS LIST -continued

| | | |
|---|---|---|
| | 112 | Second Opening |
| | 130 | Main Lid Hinge |
| | 140 | Housing Outer Base |
| | | 141a-d    Housing Feet (4 each) |
| | | 142a and 142b Suction Cups |
| | | 143a and 143b Suction Cup Levers |
| | 151 | Back Beveled Ridge Segment |
| | 152a and b | Side Beveled Ridge Horizontal Segments |
| | 153a and b | Side Beveled Ridge Vertical Segments |
| | 154a and b | Side Beveled Ridge Arcuate Segments |
| | 180a-b | Bin Interface Channels |
| 200 | Lid Assembly | |
| | 210 | Main Lid |
| | | 212a    Main Lid Outer Beveled Surface |
| | | 212b    Main Lid First Inner Beveled Surface |
| | | 212c    Main Lid Second Inner Beveled Surface |
| | | 213    Main Lid Aperture |
| | | 214    Main Lid Hatch Hinge |
| | | 215    Main Lid Hatch Gap |
| | | 216    Main Lid Main Latch |
| | 220 | Hatch Lid |
| | | 221    Hatch Lid Latch |
| | | 222.    Hatch Lid Hinge Pin |
| | | 223    Hatch Lid Tab |
| 300 | Bin | |
| | 310 | Bin Handle Assembly |
| | 320 | Bin Pour Spout |
| | 330 | Bin Inside Bottom |
| | | 331 Bin Inside Bottom Ridges |
| | 340 | Bin Outside Bottom Surface |
| | | 341a-b    Housing Interface Channels |
| | 350a-d | Bin Tabs |
| 400 | Component Tray | |
| | 410 | Perforations |
| | 420 | Block Receptacle |
| | 430 | Tray Vents |
| 500 | Hopper | |
| | 510a-n | Flanged Ribs |
| | 511a-n | Flanged Channels |
| | 520 | Hopper Handle |
| | 530 | Hopper Upper Opening |
| | 540 | Hopper Lower Opening |
| 600 | Blade Assembly | |
| | 610 | Axle |
| | 620a-h | Blades |
| | | 621a-d curved blade segments |
| | | 622 hex-shaped blade aperture |
| | | 623a-b    hooks |
| | 630a-f | Struts |
| | | 631a-b curved strut segments |
| 700 | Crank Assembly | |
| | 710 Crank Arm | |
| | 720 Crank Handle | |
| 800 | Crank Motor | |

DETAILED DESCRIPTION OF EMBODIMENTS

Referring now to the drawings, written descriptions of exemplary embodiments of the present invention follow.

Precomposter 10 may include a housing 100, a lid assembly 200, a bin 300, a component tray 400, a hopper 500, a blade assembly 600 and a crank assembly 700. The construction of composter 10 components may be as follows: housing 100 includes first opening 111 and lid assembly 200 is attached on top of opening 111; lid assembly 200 includes main lid 210 and hatch lid 220 mounted within maid lid 210 wherein opening hatch lid 220 provides access to first opening 111; housing 100 also includes second opening 112 on a side of housing 100 and below opening 111 wherein bin 300 may reside and be removed from; component tray 400 may be affixed to the inner surface of housing 100; hopper 500 may be affixed to component tray 400; blade assembly 600 may substantially reside within, and may be mounted to, hopper 500 and may be rotatably mounted to housing 100; and crank assembly 700 may substantially reside external to housing 100 and may be connected to axle 610 which has assembled thereto blades 620 and struts 630, wherein when crank assembly 700 is rotated, in either direction, blades 620 rotate and in conjunction with fixed struts 630 and in conjunction with hopper 500 may precompost organic material feed into opening 111 and deliver the precomposted organic material to bin 300 which when housed in housing 100 collects the precomposted material.

It should be noted that "organic material" is one term for what the subject invention precomposter 10 may precompost or process. It is not the intention of the applicant to vary from this concept when referring to "kitchen scraps" or "scraps" or similar. While alternative embodiments of the subject inventions may include organic material which is not typically associated with the kitchen, referring to "kitchen scraps" and the like may be beneficial to the reader to put the use of precomposter 10 in that particular context.

The components, and their relationships, will now be described in greater detail.

Housing 100 may include beveled ridge on 3 sides that will provide an ergonomic gripping surface to facilitate moving precomposter 10 in any upward and/or sideway direction. Because of the forces necessary for precomposting many organic kitchen scraps precomposter 10 may weigh approximately 8 pounds, which may not be easy for many users to move when reaching for precomposter 10 in a distal location with their arms. For example, it may be preferable to store precomposter 10 conveniently under a kitchen cabinet on a kitchen countertop which will require upward and horizontal forces to move precomposter 10 to and from such a distal storage location.

Users may prefer to precompost scraps when precomposter 10 is not under a kitchen cabinet—which require the movement thereof described above. Nevertheless, precomposter 10 may be designed to accommodate typical clearance between a kitchen countertop and upper kitchen cabinets—approximately 18 inches. A design of precomposter 10 has a height of less than 13 inches and a height of less than 17 inches when hatch lid 220 is fully open.

The beveled ridge is depicted as continuous along the back and two sides of housing 100. The ridge includes: back segment 151 which is horizontal; side horizontal segments 152a and 152b which are substantially horizontal; and side vertical segments 153a and 153b which are substantially vertical. There is no beveled ridge along the front side of housing 100.

Vertical segments 153a and 153b include a modest horizontal drift toward the back of housing 100 as they rise along the sides of housing 100. This enables a user, who for example will pull precomposter 10 out from under an upper kitchen cabinet, to exert a modest lifting force, which will lower the shear frictional force resulting from dragging feet 141a-d and/or cups 143a and 143b along the kitchen countertop, which may thereby make it easier to pull composter 10 to a countertop position which preferable to the user.

A beveled surface, in contrast to a 90 degree ridge, may provide a more ergonomical interface surface for a human hand or finger in that it may be more comfortable to engage and distribute loads over a greater area of the user's hand or fingers thereby making it easier for the user to move or orient precomposter 10.

The location of vertical segments 153a and 153b are preferably of the same design and location on each side of precomposter 10, so the user may more easily stabilize precomposter 10 when moving same by symmetrically engaging precomposter 10. The fore/aft position of segments 153a and 153b are preferable ergonomic in design. Ergonomic considerations include the center of mass of precomposter 10 and common means for grabbing and lifting precomposter 10. In particular side beveled ridge arcuate segments 154a and 154b are positioned such that a user may securely grab precomposter 10 by engaging 154a and 154b with her fingers and the main lid outer beveled surfaces 212a-c with the palmar region of her hand.

In an exemplary embodiment housing 100 can have a housing outer base 140 which includes housing feet 141a-d and suction cups 142a and 142b. The feet 141a-d and cups 142a-b are designed to all rest on a countertop, or other flat substantially horizontal surface, when precomposter 10 is at rest. At rest is to be distinguished from precomposter 10 suspended by for example a user utilizing a beveled ridge as described herein to lift precomposter 10. When precomposter 10 is suspended cups 142a-b will project slightly distal to precomposter 10—specifically slightly distal to the plane defined by the bottom of feet 141a-d.

When precomposter 10 is set upon a smooth substantially flat substantially horizontal surface in preparation for precomposting, cups 142a-b may form a seal with the surface, facilitated by the deformation of cups 142a-b when set upon such a surface. Cups 142a-b and said surface are preferably clean void of particulates or other substances which may compromise a seal. The user can then rotate cup levers 143a-b which may secure the seal with the for example countertop and as levers 143a-b are rotated cup diaphragms 144a-b create a progressively greater cavity (concave) which in turn creates a vacuum which in turn secures precomposter 10 to the countertop and thereby facilitates use of precomposter 10.

The design of lid assembly 200 in an exemplary design is also cognizant of the desire to secure precomposter 10 when in use. Main lid 210 is substantially square in general shape with a rectangular aperture 213 approximately centered therein. Main lid 200 includes main lid outer beveled surface 212a, main lid first inner beveled surface 212b and main lid second inner beveled surface 212c. Beveled surfaces 212a and 212b provide ergonomic surfaces which may allow the user to stabilize precomposter 10 when in use. The user may crank the crank assembly 700 with one hand and brace precomposter 10 with his other hand—in particular the palmar region of the hand.

Main lid second inner beveled surface 212c provides a shoot for directing kitchen scraps to and through main lid aperture 213. Hatch lid 220 may be rotatably affixed to main lid 210 at main lid hatch hinge 214, and may be secured in a closed position with main lid hatch latch 215 by means well known in the relevant arts. Preferably hatch lid 220 is approximately level with the junction between inner beveled surface 212b and second inner beveled surface 212c when in a closed or latched position. Hatch lid 220 and hatch hinge 214 are design to allow substantially full access to the aperture defined by the junction of first inner beveled surface 212b and second inner beveled surface 212c thereby not encumbering or blocking the delivery of kitchen scraps to main lid aperture 213.

Hatch lid 220 is preferably transparent. This allows the user to see organic material in hopper 500 as it is processed. While hopper 500 and blade assembly 600 are designed to cut organic material it should be noted other processes may result. Prototype tests of the subject invention indicate materials are not only cut, or shredded, by precomposter 10, but materials may also be mashed, or masticated, or similar. This may occur for a number of reason based upon the immutable laws of physics, but are apparent as a result of the no-bladed surfaces within hopper 500 and the forces exerted on materials by blade assembly 600 and how that may impact adjacent materials.

Watching the precomposting process may alert the user, for example, as to when it is prudent to reverse the rotation of blade assembly 600 or when it is prudent to take other action which may improve the precomposting process.

Main lid 210 is removably and rotatably affixed to the top of housing 100 at main lid hinge 130. Main lid hinge 130 and the main lid hinge pin are collectively designed to inhibit removal of main lid 210 from housing 100 except when main lid 210 is at approximately a 60 angle to housing 100 or specifically at approximately 60 degrees to main lid hinge 130 which means, generally, approximately 60 degrees to horizontal. This can be appreciated by noting the size, positioning and location of main lid hinge 130 generally and specifically main lid hinge arcuate cups and main lid hinge arcuate gaps vis-à-vis the main lid hinge pin generally and main lid hinge pin double-D segments. The arcuate gaps are centered at approximately 60 degrees and define an arcuate gap of approximate 50 degree.

It may also be appreciated from the designs of main lid hinge 130 and the main lid hinge that main lid 210 will be at approximately 110 degrees when fully opened. Precomposter 10 may be dimensioned such that it fits under standard abovecounter cabinets when main lid 210 is fully opened.

When main lid 210 and hatch lid 220 are rotatably closed they collectively cover first opening 111 in the top of housing 100.

When main lid 210 is closed and hatch lid 200 is opened kitchen scraps may be placed into the opening or aperture defined by main lid 210 which further defines first opening 111 in housing 100. In this exemplary embodiment means for composting are below first housing opening 111, namely hopper 500 and blade assembly 600.

To provide structural integrity and rigidity an exemplary embodiment includes component tray 400. Component tray 400 may be secured to the interior of housing 100, and hopper 500 may be secured to component tray 400. Blade assembly 600 is affixed to hopper 500, and crank assembly 700 is affixed to blade assembly 600. Rotating crank assembly 700 drives blade assembly axle 610 which in turn rotates blades 620a-h which in conjunction with fixed struts 630a-f shred the kitchen scraps placed through main lid aperture 213.

Housing 100 includes a second opening 112 which may be interfaced with bin 300. Bin 300 may slidably engage housing 100, specifically wherein a bin outside bottom surface 340 is design to slidably engage housing inside bottom surface 142. Bin 300 and housing 100 are design to position bin 300, when fully slid into housing 100, under hopper 500 so as to collect precomposted, that is shredded and/or cut and/or masticated, kitchen scraps. Bin 300 will collect, with the aid of gravity in this exemplary embodiment, such precomposted scraps.

A user of precomposter 10 may at her discretion either empty bin 300 of accumulated liquid or of the entire contents of bin 300. The nature of such precomposting typically creates quite a bit of liquid. And given the organic nature of kitchen scraps, the fact that precomposter 10 will typically be stored at room temperature and the fact that it may be desirable not to empty bin 300 every time scraps are precomposted—bin 300 may often become a prime host for bugs, bacteria, foul odors and other undesirables for the kitchen environment. Composter 10 is designed to address these issues in many ways.

Bin pour spout 320 is designed to enable the user to pour off such undesirable liquids without dumping the solid, or at least larger or cohered solid, precomposted materials in bin 300.

Those users who do not have a larger bin to store precomposted material in the kitchen, which is not uncommon, may choose to empty bin 300 as infrequently as possible directly into an outdoor composting device or even an indoor composting device which may be relatively remote to their kitchen—thereby minimizing their inconvenience. Spout 320 is of a simple concave arcuate design to facilitate the pouring liquids from bin 300.

The inside bottom surface of housing 100 includes bin interface channels 180a-b to slidably engage housing interface channels 341a-b on bin outside bottom surface 340.

Bin 300 also includes bin tabs 350a-d to engage specifically design bags (not shown) or the like which may facilitate disposal of pre-composted materials for certain users of precomposter 10.

Composter 10 includes a number of designs features which may mitigate such undesirable results of storing even small amounts of precomposted material. Bin inside bottom ridges 331 are designed to channel and accumulate liquids so they may be readily poured out of bin 300. Housing 100 is vented per housing vents. Housing 100 is designed to house hopper 500 but preferably hopper 500 is spaced an appreciable distance from the inside of housing 100 to allow for circulation of air inside precomposter 10. Additionally, bin 300 is oversized in relation to the bottom of hopper 500 thereby allowing for air to move from bin 300 around hopper 400. Component tray 400 includes perforations 410 designed to align with the housing vents allowing air to exit precomposter 10. Component tray 400 includes block receptacle 420 designed to receive a correspondingly designed block (not shown) which may house Xeolite, herbs or other substances which may mitigate orders, insects or other undesirable products of pre-composted material(s) including those in bin 300.

Blade assembly 600 includes axle 610, blades 620a-h, struts 630a-f and miscellaneous bushings and spacers with means of use well known in the arts to allow axle 610 and blades 620a-h, removably fixed in place to axle 610, to rotate relative to fixed struts 630a-f, and fixed hopper 500. Moreover, the distal ends of struts 630a-f may be slid into hopper 500 from below wherein said distal ends slide into corresponding hopper channels 511a-g flange channels on one side of hopper 500 and hopper channels 511h-n on the other side of hopper 500.

Struts 630a-f may include holes at their ends (not shown) which align with hopper flanged rib holes (not shown). A hopper rod (not shown) may fix struts 630a-f to hopper 500. Flanged ribs 510a-n may provide addition structural integrity to hopper 500.

Hopper 500 may include a hopper handle 520 which may facilitate the removal of hopper 500, including blade assembly 600 for cleaning or repair. Preferably, hopper 500 may be easily disconnected from component tray 400 by means well known in the mechanical arts which may include utilization of hopper tabs 550a-b.

A crank assembly 700 may be releasably attached to the end of axle 610 by means well known in the mechanical arts wherein rotation of crank arm 710 affixed to axle 610 rotates blades 620a-h relative to fixed struts 630a-f and hopper 500. Organic material placed in first opening 111 will fall into hopper upper opening 530 whereupon rotating blades 620a-h will mechanically process, including cutting, the organic material. Cutting is enhanced by the design of struts 630a-f which may include concave segments 631a and 631b which may vary in curvature from strut to strut or even on a single strut. A concave design may cradle organic material to be shredded by blades 620a-h such cradling tends to hold the material in place while significant forces are exerted on the material by one or more of blades 620a-h.

Figure 6A:
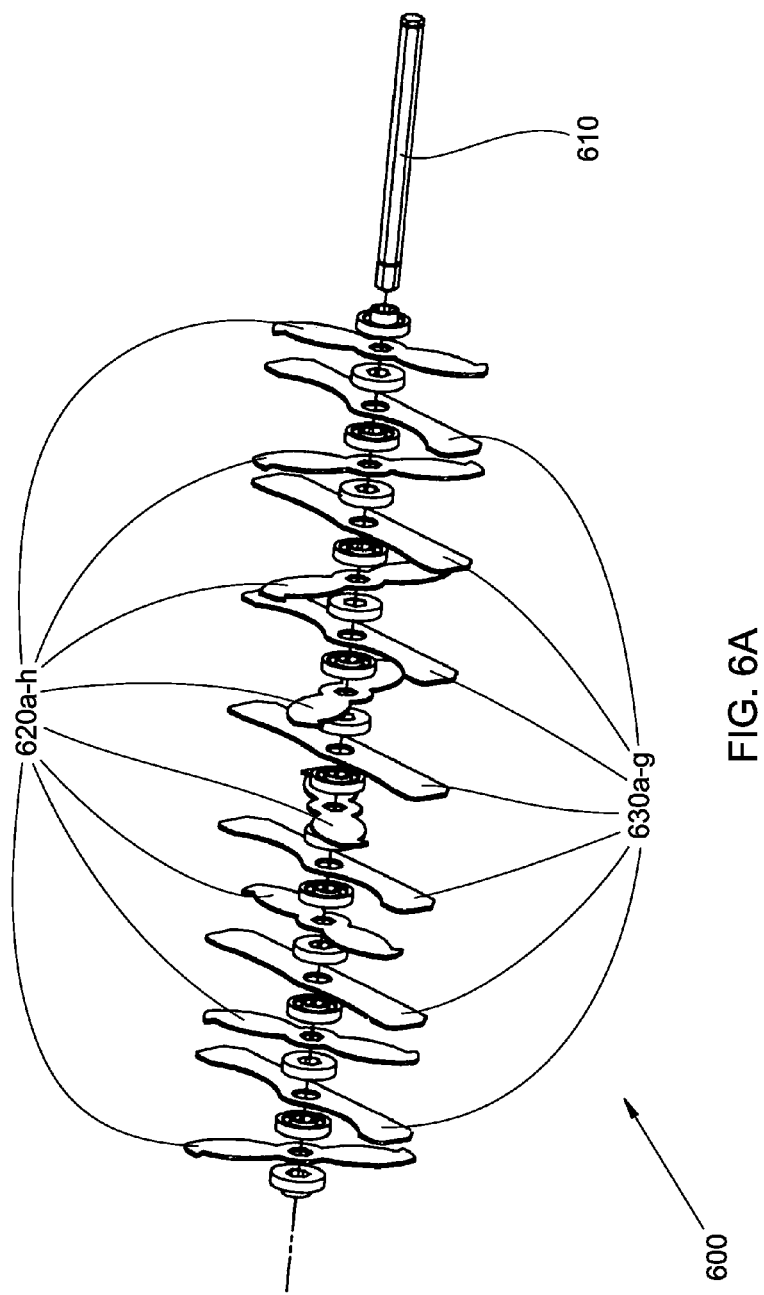
FIG. 6A is an exploded view of a blade assembly of the exemplary kitchen shredder.
Figure 6B:
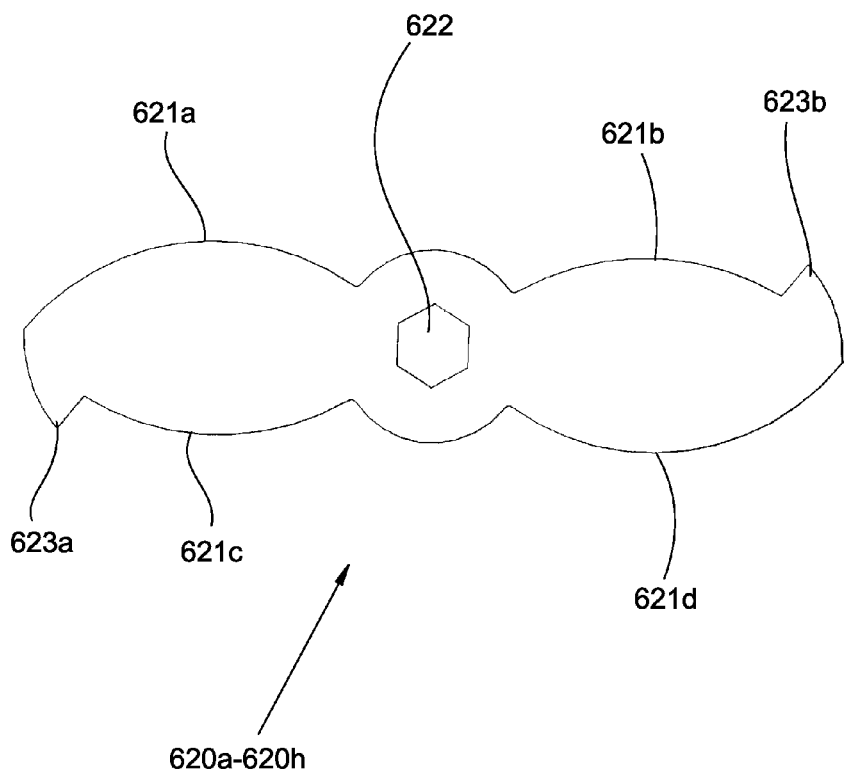
FIG. 6B is a side view of a blade of the blade assembly.
Figure 6C:
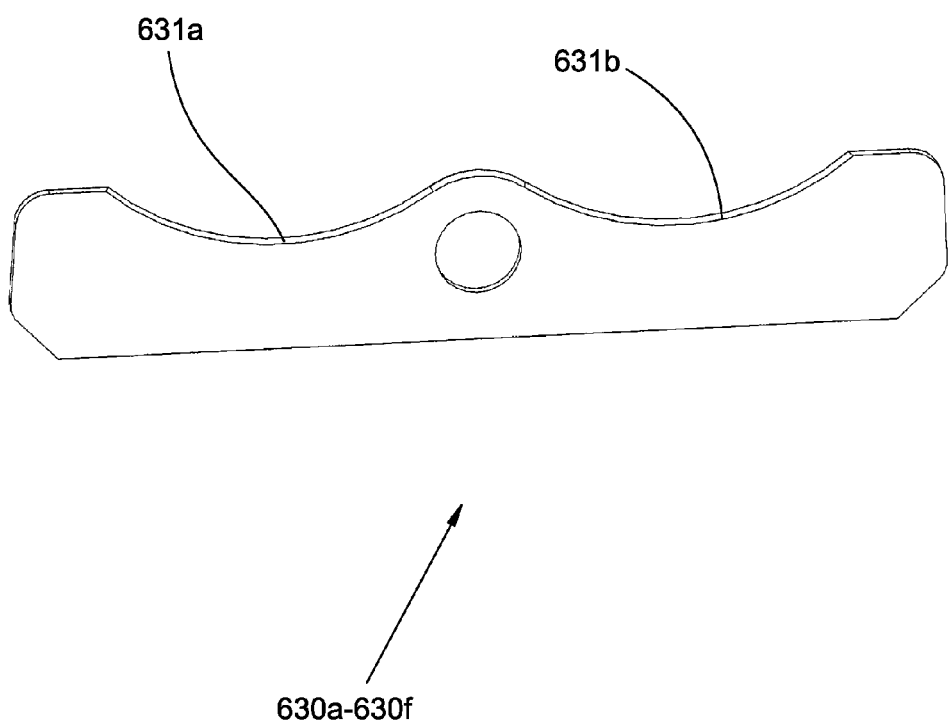
FIG. 6C is a perspective view of a strut of the blade assembly.
Figure 7:
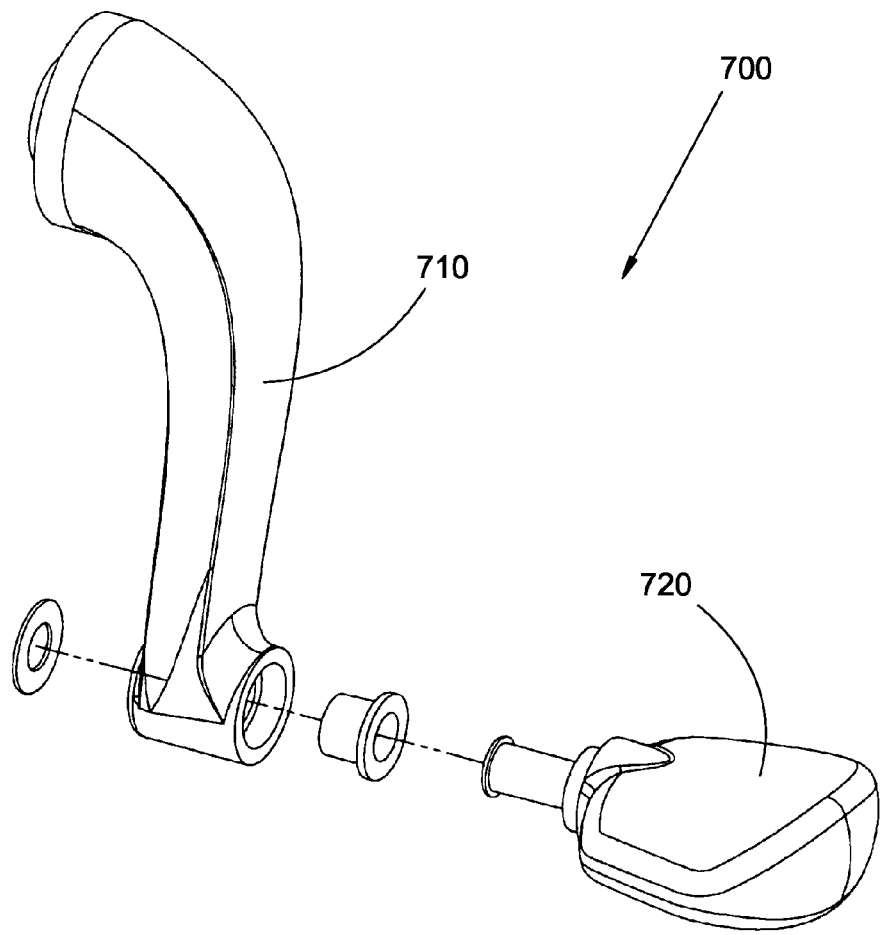
FIG. 7 is an exploded view of a crank arm assembly of the exemplary kitchen shredder.

The specific blade design depicted in FIG. 6B has a number of potential benefits. Curved portions 621a-d may vary the point of greatest force on the material facilitating the cutting of tougher materials. If material stick to the interior walls of hopper 500 hooks 623a and 623b may pull material of said walls. The direct drive design allows hooks 623a and 623b to reverse direction to assist in such dislodging. In an alternative embodiment curve blade segments 621a and 621b may have a sharp edge to cut material whereas 621c and 621c may have a duller edge to enhance masticating or crushing material. Alternatively, a precomposter 10 which does not rely on the assistance of gravity, or relies less on gravity, hooks 623a-b may grab and pull organic material into the precomposting mechanism.

A hex shaped axle 610 may correspond to a hex shaped aperture 622 in blades 620a-h. Preferably blades 621-h are 60 degrees out of phase wherein two pairs of blades (620a and 620g, and 620b and 620h) are always in the same rotational position. Other cross-sectional shapes may be functionally equivalent for axle 610 and blade aperture 622.

Figure 8:
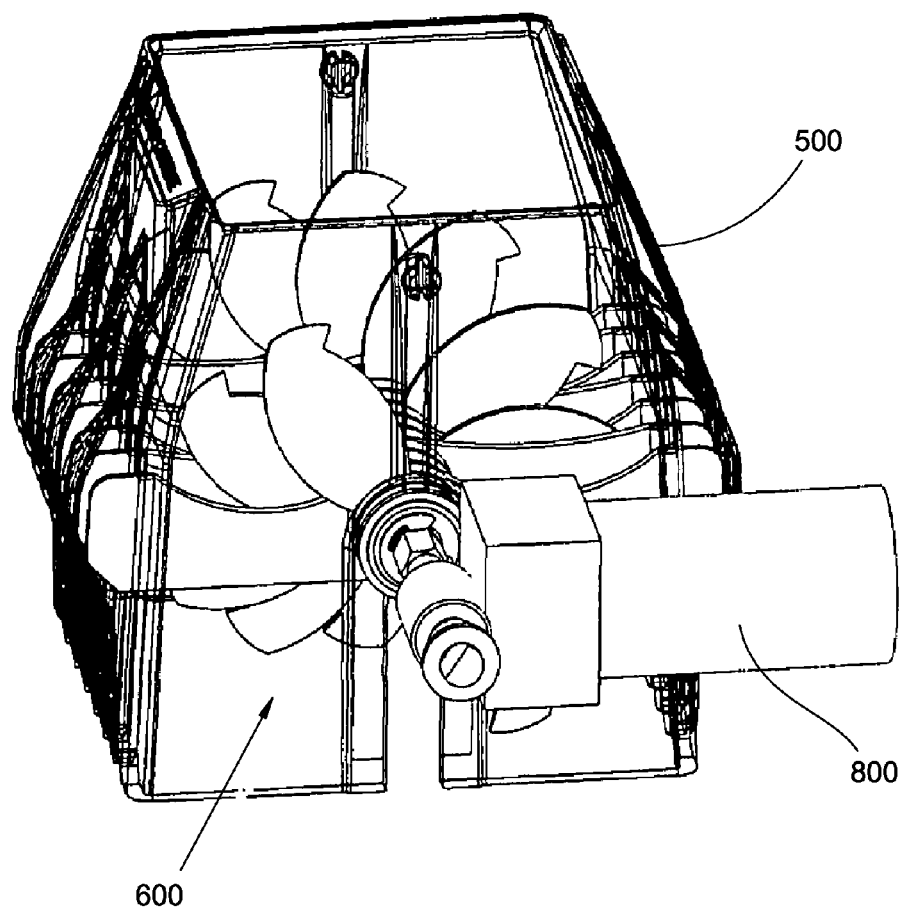
FIG. 8 is a perspective partially transparent view of the hopper, the blade assembly, and a crank motor of the exemplary kitchen shredder.

Crank assembly 700 includes crank handle 720 which may be ergonomically design to comfortably receive the palmar region of a human hand which may facilitate rotating crank arm 710 in a clockwise or counterclockwise direction. Alternatively, a gearing mechanism (not shown) well known in the arts may vary the 1 to 1 ratio of crank handle rotation and axle 610 and blades 620 a-h rotation. Alternatively, as depicted in FIG. 8 an internal electric motor, or the like, generically depicted as 810 could be included to power the rotation of blades a-h and axle 610.

Alternatively, in an alternative exemplary embodiment the precomposter may be simply comprised of a housing with two openings and precomposting means therebetween. In such an embodiment means well known in the mechanical arts would allow for an axle to be rotatably fixed at its distal ends to a housing wherein a blade would be removably fixed to the axle and a strut would be fixed to the interior of the housing.

It is intended that equivalents of the disclosed exemplary embodiments, alternative embodiments and/or preferred embodiments and methods shall fall within the scope of the present disclosure and claims—or as amended. It is intended that the disclosed embodiments and methods, and equivalents thereof, may be modified while remaining within the scope of the present disclosure or claims or so appended.

For the purposes of the present disclosure and appended claims, the conjunction "or" is to be construed inclusively (e.gt. "a dog or a cat" would be interpreted as "a dog, or a cat, or both"; e.g., "a dog, a cat, or a mouse could be interpreted as "a dog, or a cat, or a mouse, or any two, or all three"), unless: (i) it is explicitly stated otherwise, e.g., but use of "either . . . or", "only on of . . . ", or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof shall be construed as open ended terminology, with the same meaning as if the phrase "at least" were appended after each instance thereof.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A shredding apparatus comprising a shredder assembly, the shredder assembly comprising:
   a removable hopper having an upper opening, a lower opening, a first plurality of lateral, substantially vertical channels in a side of the hopper, and a second plurality of lateral, substantially vertical channels in another side of the hopper opposite the first plurality of channels;
   a substantially horizontal axle rotatably mounted through sides of the hopper with the first and second pluralities of channels being on opposite sides of the axle;
   a plurality of struts, each of which has a first end received in a corresponding channel of the first plurality of channels, has a second end received in a corresponding channel of the second plurality of channels, and is adapted to receive said axle through the strut's central portion such that said axle can freely rotate within the strut,
      wherein engagement of the ends of the struts in the corresponding channels limits or prevents rotation of the struts relative to the hopper upon rotation of the axle; and
   a plurality of blades, each of which is non-rotatably mounted at a central portion thereof on the axle, arranged with the struts and the blades alternating along the length of the axle, wherein:
      rotation of the axle causes rotation of the blades relative to the hopper and struts, and
      the shredder assembly is arranged so that rotation of the axle and concomitant rotation of the blades relative to the hopper and struts causes material entering the hopper through the upper opening to be drawn between the struts by the rotating blades and to exit through the lower opening.

2. The shredding apparatus of claim 1 further comprising:
   a housing having a top opening and a front opening; and
   an open-topped bin received within the housing through the front opening and removable from the housing, wherein:
      the shredder assembly is positioned within the housing so that material passing through the housing from the top opening into the bin passes through the shredder assembly, and
      the upper opening of the hopper communicates with the top opening of the housing and the lower opening of the hopper communicates with the open top of the bin.

3. The shredding apparatus of claim 2 further comprising a hand crank or a motor mounted in or on the housing and operatively coupled to drive rotation of the axle.

4. The shredding apparatus of claim 2, wherein the housing includes a removable upper lid having the top opening formed therein.

5. The shredding apparatus of claim 2 further comprising a hatch lid attached to the housing, wherein the hatch lid is movable between a closed position substantially blocking the top opening and an open position permitting passage of material through the top opening.

6. The shredding apparatus of claim 5, wherein the hatch lid is substantially transparent.

7. The shredding apparatus of claim 2, wherein the bin includes one or more protruding ridges on a bottom, interior surface thereof, and wherein the ridges are arranged to channel liquid accumulated within the bin.

8. The shredding apparatus of claim 2, wherein the bin includes a handle arranged to facilitate removal of the bin from the housing and a pour spout arranged to pour liquid accumulated within the bin.

9. The shredding apparatus of claim 2, wherein the housing includes one or more ridges on an outer surface thereof arranged to enable a user to grasp the shredding apparatus.

10. The shredding apparatus of claim 9, wherein the one or more ridges includes at least one ridge that includes a first portion extending substantially vertically along a lateral surface of the housing, a second portion extending substantially horizontally across the lateral surface of the housing, and a curved portion joining the first and second portions.

11. The shredding apparatus of claim 9, wherein at least a portion of at least one of the one or more ridges is beveled.

12. The shredding apparatus of claim 2, further comprising one or more suction cups attached to a bottom surface of the housing and arranged to secure the shredding apparatus to a support surface.

13. The shredding apparatus of claim 2, wherein the shredder assembly is slidably removable from the housing.

14. The shredding apparatus of claim 13 further comprising a handle attached to the hopper and arranged to facilitate removal of the shredder assembly from the housing.

15. The shredding apparatus of claim 13, wherein the housing includes a removable upper lid having the top opening formed therein wherein the upper lid is arranged so that removal thereof facilitates removal of the shredder assembly from the housing.

16. The shredding apparatus of claim 1, wherein the axle is removable from the hopper and the struts and the blades are removable from the axle.

17. The shredding apparatus of claim 1, wherein each blade has, between the central portion and each end thereof, a convex edge portion.

18. The shredding apparatus of claim 1, wherein each strut has, between the central portion and each end thereof, a concave upper edge portion.

19. The shredding apparatus of claim 18, wherein curvature of the concave upper edge portion of each strut differs from at least one other strut.

20. The shredding apparatus of claim 1, wherein each end of each blade has at least one hook.

21. The shredding apparatus of claim 1, wherein at least one of the blades has at least a portion of a sharpened edge.

22. The shredding apparatus of claim 21, wherein at least one of the blades has opposed sharpened edges.

23. The shredding apparatus of claim 1, wherein at least one of the struts has at least a portion of a sharpened upper edge.

24. The shredding apparatus of claim 1, wherein:
   the vertical channels of at least one of the pluralities of channels each includes at least one flange with an aperture therethrough arranged so that the apertures of that plurality of channels are substantially aligned along a straight line;
   each strut includes an aperture through at least one end thereof that is substantially aligned with the aperture of the flange of the corresponding channel with the end of the strut received in the corresponding channel; and
   the shredder assembly further comprises a pin inserted through the substantially aligned apertures of the struts and flanges.

25. The shredding apparatus of claim 1, wherein the lower opening of the hopper is larger than the upper opening of the hopper.

26. The shredding apparatus of claim 25, wherein at least a portion of an interior surface of the sides of the hopper has an inverted slope.

27. The shredding apparatus of claim 1, wherein the axle and the blades are rotatable in both clockwise and counterclockwise directions.

* * * * *